United States Patent [19]

Melrose et al.

[11] 4,084,812
[45] Apr. 18, 1978

[54] PLAYGROUND SWING APPARATUS

[75] Inventors: Kendrick B. Melrose, Edina; Gerald E. Kimmel, Minnetonka; William F. McCombs, Edina, all of Minn.

[73] Assignee: Game Time, Inc., Litchfield, Mich.

[21] Appl. No.: 627,755

[22] Filed: Oct. 31, 1975

[51] Int. Cl.² .............................................. A63G 9/00
[52] U.S. Cl. ........................................ 272/85; 272/78; 273/1 R; 273/95 R; 273/105 R
[58] Field of Search ................... 272/85, 78; 297/273, 297/276, 277; 273/105 R, 1.5 R, 58 C, 85, 78

[56] References Cited

U.S. PATENT DOCUMENTS

| 825,860 | 7/1906 | McKenzie | 272/78 |
| 1,744,594 | 1/1930 | Trzesniewski | 272/85 UX |
| 2,977,188 | 3/1961 | Farkas | 273/1.5 R |
| 3,397,887 | 8/1968 | Caplin | 273/58 C |

Primary Examiner—Richard C. Pinkham
Assistant Examiner—T. Brown
Attorney, Agent, or Firm—Blanchard, Flynn, Thiel, Boutell & Tanis

[57] ABSTRACT

Playground apparatus including a plurality of conventional playground swings which are supported for oscillatory or reciprocating movement above a ground surface by swing support structure. The apparatus further includes a target object which may be an inflated or air-filled spherical ball pendulously supported above the ground surface. The swings may be disposed so that the normal paths of their travel converge toward the target object so that participants using the swing may attempt to contact the target object as a play activity. Alternative target objects and swing configurations are disclosed.

16 Claims, 12 Drawing Figures

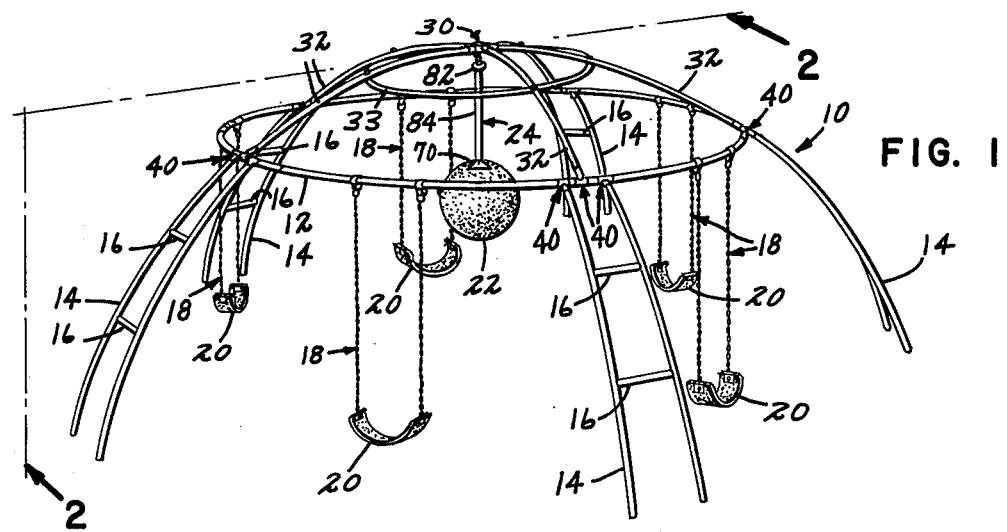
FIG. 1
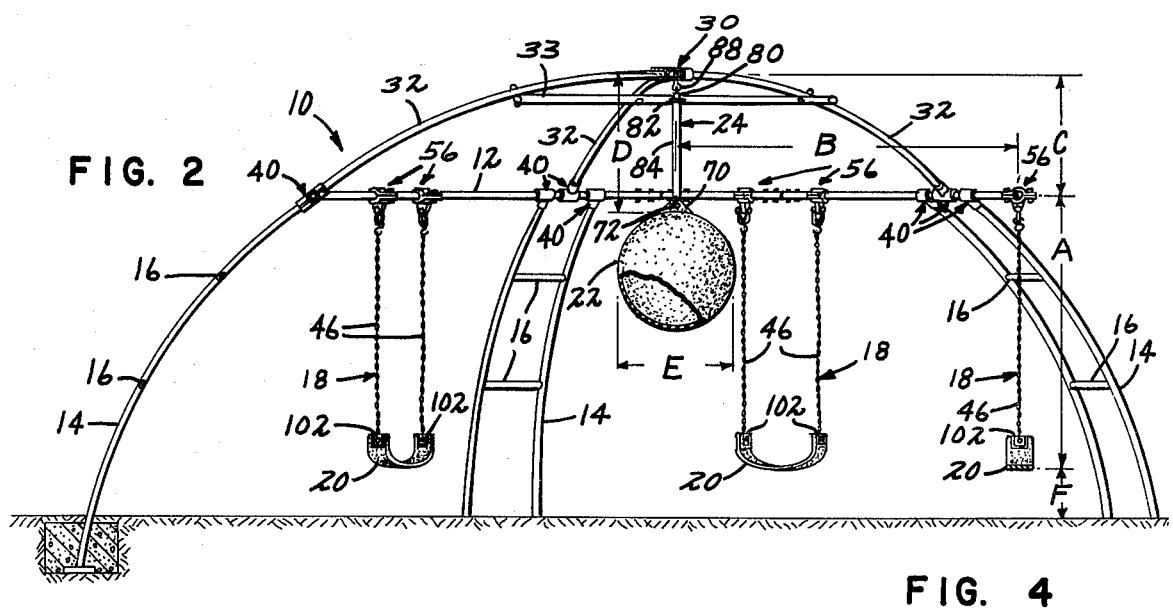
FIG. 2
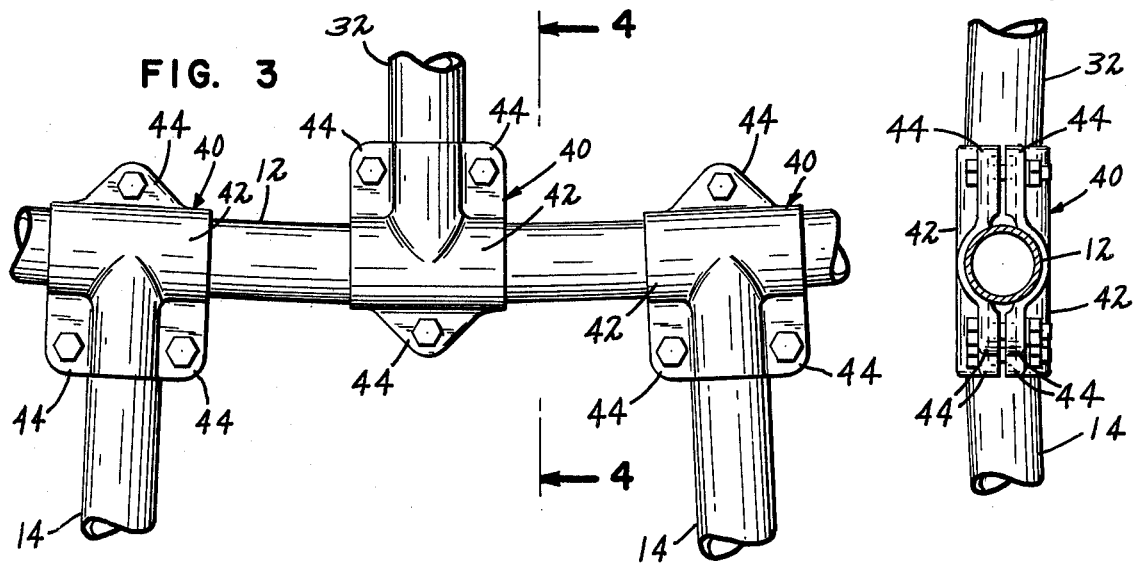
FIG. 3
FIG. 4

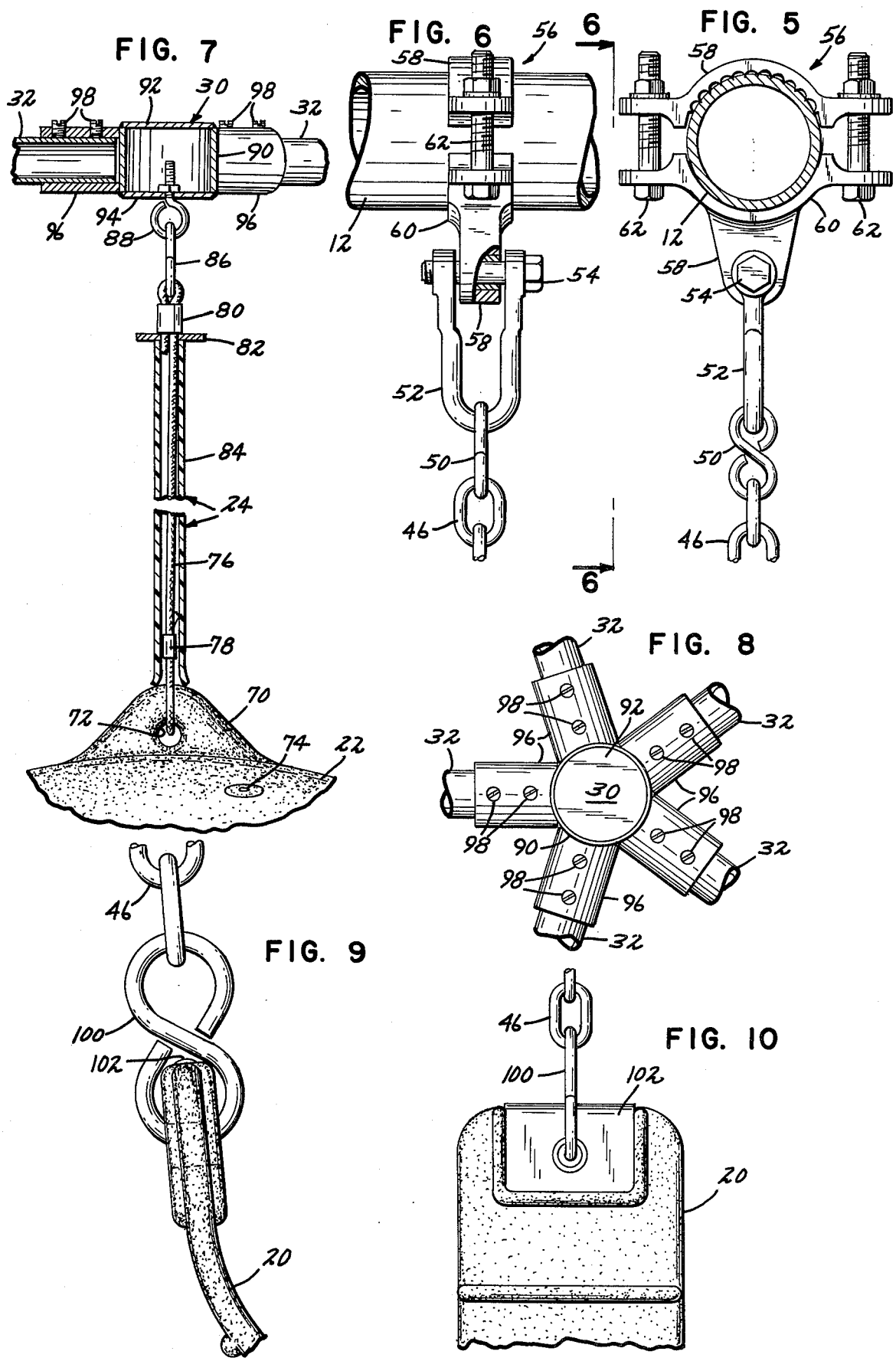

PLAYGROUND SWING APPARATUS

BACKGROUND OF THE INVENTION

This invention relates generally to playground recreational apparatus, and more particularly concerns playground apparatus including conventional swing structure in combination with a target object to provide improved play activity.

Playground swings, that is seats suspended by rope or chains from a support structure for swinging to and fro for pleasure of participants are a conventional and very popular playground apparatus. Multiple swings on a common frame work have long been known. However, such multiple swings generally provide adjacent swings disposed linearly with their travel generally in parallel paths. Such activity is eventually monotonous to the participants as its involves no significant challenge in coordination other than sufficient coordination to maintain the reciprocatory movement of the swing itself.

The present invention adds a dimension and an additional play activity to the swinging activity by providing a target object at the inner end of the swing arc. The target object provides the participant on the swing with an objective requiring coordination and therefore, providing satisfaction when the objective is met. Swing equipment as presently known provides no interaction between a participant and target object. Furthermore, in certain embodiments of the present invention using a plurality of swings and a target object, the apparatus becomes basically a group activity providing the possibility of a competitive game with a plurality of participants on swings attempting to achieve the target objective.

SUMMARY OF THE INVENTION

In accordance with the invention the playground apparatus includes a support structure with swinging means suspended above a ground surface from said support structure for reciprocatory transport of a player or participant riding on the swing means. In the vicinity of the swing means, a target object is positioned which is responsive to actions of the player or participant to provide a play activity requiring coordination on the part of the player to successfully cause the target object to respond.

In certain preferred embodiments of the invention, the apparatus will include a plurality of swings supported by the support means which have paths of travel which converge toward a target object. The target object may be a ball pendulously suspended from a support or supported by means of a flexible member embedded in the ground surface.

A number of alternate targets may be used. For example, stationery targets which the participant must hit to ring a bell or other noise sounding device may be used. Alternatively, the target object could be a container into which the participant tries to toss objects while swinging on the apparatus.

Each of these items provides a participant with a more rewarding activity than merely using a conventional swing. Because the participant is moving throughout the activity, considerable coordination and timing must be developed in order to successfully perform it. This adds to interest in the play activity as well as developing motor coordination.

BRIEF DESCRIPTION OF THE DRAWINGS

Additional objects and advantages of the invention will become apparent after a reading of the following detailed description and upon reference to the drawings, wherein the use of like reference numerals throughout the several views indicates like elements. Referring particularly to the drawings:

FIG. 1 is a perspective view of plural swing playground apparatus constructed according to a preferred embodiment of the present invention utilizing a pendulously suspended inflatable ball as the target object;

FIG. 2 is a sectional view of the apparatus of FIG. 1 taken generally along the line 2—2 thereof to illustrate the relationship between the target object position, swing length and other parameters;

FIG. 3 is a greatly enlarged view of a portion of the support structure of the embodiment shown in FIGS. 1 and 2 with particular emphasis on the couplers for the swing support ring, portions thereof being broken away;

FIG. 4 is a sectional view of the structure of FIG. 3 taken generally along the line 4—4 of FIG. 3;

FIG. 5 is a greatly enlarged side view of one of the swing suspension brackets with its associated support ring being shown in cross section;

FIG. 6 is a view of the swing suspension bracket of FIG. 5 taken generally along the line 6—6 thereof;

FIG. 7 is a side elevational view of a preferred embodiment of an elongated flexible suspending member for the target object and a suspending structure therefore, including details of a preferred construction of the target object, portions thereof being broken away;

FIG. 8 is a view in top plan of the target object support member shown in FIG. 7;

FIGS. 9 and 10 are fragmentary side elevational views showing one means of fastening a swing seat to a supporting chain member in a preferred embodiment of the present invention;

Figure 11:
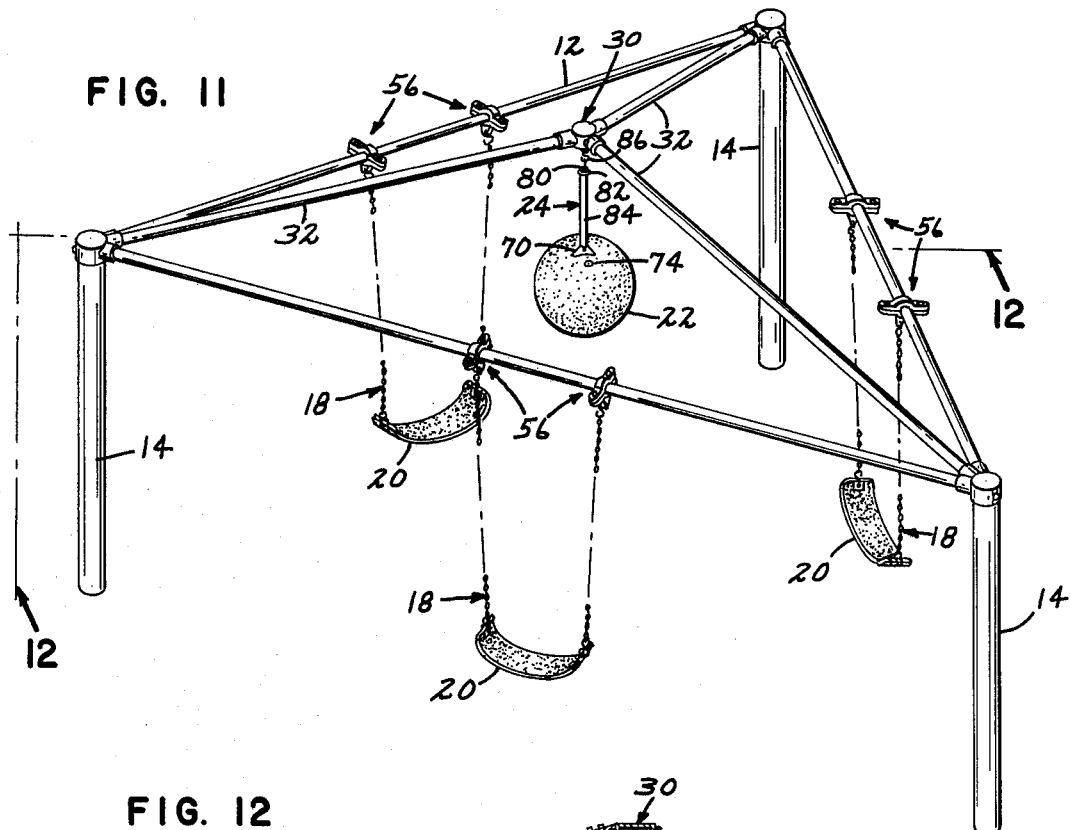
FIG. 11 is a perspective view of a three-swing embodiment of the present invention using a triangular support ring, but using a spherical pendulously supported target object.

While the invention will now be described in connection with preferred embodiments thereof, the invention is not limited in scope to those embodiments. On the contrary, all alternatives, modifications and equivalents included within the spirit and scope of the invention as defined by the appended claims are covered.

DETAILED DESCRIPTION OF THE INVENTION

Referring particularly to the drawings, FIGS. 1 and 2 show a preferred embodiment of the playground apparatus 10 of the present invention. Playground apparatus 10 includes a support structure, which in this particular embodiment includes a support ring 12 suspended above a ground surface by means of a plurality of support legs 14, which, in the embodiment shown, are equally spaced about support ring 12, which is circular. The function of the support structure is to provide support for the suspension of one or more conventional swing means for reciprocatory transport of participants riding on the swing to and fro for pleasure.

While the preferred embodiment of the present invention uses plural swings which are supported so that during their normal paths of travel, they converge and diverge from one another, other configurations such as a single swing supported in conventional fashion could as well be used.

In the embodiment shown with particularity in FIGS. 1 through 10, support legs 14 are paired and joined by crossbraces 16. Such a construction provides additional strength and rigidity to the support structure. The support structure may be made of conventional tubular steel galvanized to protect against rust or any other suitable playground equipment material. One possible alternative would be to use a rustic log and pipe construction which has recently become popular.

In the embodiment shown support ring 12 is circular. Support ring 12 may be constructed by welding a number of segments together or by any other suitable means of constructing a support ring for the swing means. A number of swing means 18 are attached to and suspended from support ring 12. While not essential, it is preferable to have these spaced equally about the support ring. Swing means 18 are suspended above the ground surface from support ring 12 for conventional cyclic swinging action. The details of the swing construction are not believed to be essential to the present invention, but these details will be covered below to fully describe the embodiment shown in FIGS. 1 through 10.

Apparatus 10 includes a target object 22 positioned in the vicinity of the swing means and responsive to actions of participants or swing occupants to provide play activity requiring coordination on the part of the swing occupants to successfully cause the target object to respond. In the embodiment shown in the drawings, the target object is a spherical air-filled ball suspended from a support structure.

A wide range of various target objects could be used. For example, in the plural swing apparatus shown in FIG. 1, an alternative target object might be a central well or receptacle into which the participants attempted to toss bean bags or other items. Another possible target object might be a sprinkler head mounted centrally of a plural swing configuration, and either continuously rotating or free to change direction in response to participant contact with a direction control target. In such a configuration, the target objective might be either to avoid or contact the water stream. In the preferred embodiment shown, the target objective is to kick or otherwise contact the target object as the participants swing to and fro while occupying swing means 18.

In one class of important embodiments of the present invention, the target object will be resiliently suspended above the ground and the swings and support structure and placement of the target object will be such that the participants or occupants of the swing or swings may kick or contact the target objects with their feet or hands. For this purpose, there are a number of alternative means for mounting or suspending the target object above the ground. One of such means is, as shown in the drawings, an elongate, flexible suspending member 24. In the embodiment shown in FIGS. 1 through 10, member 24 is fastened by means of an eye bolt and S-hook construction shown in detail in FIG. 7 to a five-way socket 30 shown in plan in FIG. 8. While the details of the preferred embodiment of member 24 will be later discussed, member 24 might be a rope, chain or a vinyl encased rope or chain which gives target object 22 a pendulous action in response to kicking or contact. The point of pivot of the pendulum will be the eye bolt and S-hook connection at socket 30. One possible alternative for suspension of target object 22 would be a resilient pedestal having one end fastened to target object 22 and an opposite end anchored below the ground surface. In the preferred construction, the target object is mounted centrally of the playground apparatus 10 and swing means 18 are spaced about the closed support ring or frame 12. As is apparent from the structure shown in FIGS. 11 and 12, support ring 12 need not be circular, but may be of a polygonal shape, or may comprise a number of separate swing support structures positioned relative to one another so that a target object can be positioned where participants on one or more swings can affect it.

It has been found preferable to utilize, in preferred embodiments, an odd-numbered plurality of swings equally spaced about a centrally located target object 22 so that no two swings have their normal paths of travel on a straight line towards one another. This is believed to be a safer configuration since the swings have only a component of travel in the same direction and if the ball is kicked by two occupants at the same time, there is not as much likelihood that there will be a transfer of force directly from one participant to another through the target object.

In those embodiments in which a plurality of swings have paths of travel which converge toward a centrally located target object, there are a number of considerations in selecting dimensions of the target object and its relation to the spacing of the swings and the length of the suspension members for the swings. First, since the contact between the target object and the participant causes a reaction to the swings path of travel, it is desirable to have a light but tough target object such as an air-inflated ball, or a foam filled polyhedron or other solid. Secondly, it is preferable if the swings are spaced so that in normal travel they will not contact one another nor will their arcs of travel cause them to come in contact with the target object in its at rest position. In the embodiments shown in the drawings, where the target object is primarily designed to be kicked or contacted with the feet and caused to oscillate with a pendulous motion, the swings should be located and sized so that the average size participant will be able to contact the ball with his feet during the path of travel of the swing. In addition, it is preferable to relate the swings and the suspension member for the target object so that it is difficult if not impossible to hook ones feet or legs in the suspension member in attempting to contact the target object. If the target object is a suspending member 24 such as shown in the FIGS. 1 and 2, then the swings are placed low enough with respect to the target object so that the participants feet are not likely to be able to contact the upper portion of the ball. Conversely, if the suspending member were a pedestal, the ball would be placed lower to lessen the possibility of contact at the point of connection between the target object and pedestal.

In one specific construction utilizing structure generally as shown in FIG. 2, five swings were spaced about a generally circular support ring supported above the ground surface with a centrally located air-filled spherical ball as the target object. The target object was suspended by means of an elongate flexible suspending member from a five-way socket 30 supported by means of a number of radial arcuate tubular members 32 joining at socket 30 and supported at their opposite ends by means of couplers to support ring 12. The specific dimensions, related to the drawing through FIG. 2 by means of letter identification in FIG. 2, were as given in the following table:

| Dimension | Parameter | Value |
|---|---|---|
| A | Swing pendulum length | 66 inches |
| B | Horizontal distance between swing pivot and center of target suspending member | 108 inches |
| C | Height of target support above swing support ring | 35 inches |
| D | Length of suspending member connection for target object | 40 inches |
| E | Diameter of target object | 36–40 inches |
| F | Height of at rest swing above ground surface | 12 inches |

It will be apparent that the dimensional relationships between the target object and the swings must be so selected that the participants can affect the target object in the desired manner. For example, in the embodiment shown in FIGS. 1 and 2, there are two competing considerations in deciding the place in which the target object should be mounted. It is important to mount the target object high enough so that, as previously mentioned, the possibility of entanglement between a participants legs and the suspending member 24 is small.

On the other hand, the object should be mounted low enough so that, if possible, a generally tangential force can be imparted to the object to cause it to swing pendulously rather than to travel up and loop over the socket 30. The possibility of "looping" occurring is also lessened by providing some stiffness in flexible member 24. One means of preventing undesirable "looping" is shown in the preferred embodiment of FIGS. 1 and 2. In those Figures, a barrier ring 33 is mounted centrally of the support structure by means of through bolts fastening the ring to each of members 32. In the specific embodiment referred to in the Table above, the ring 33 selected was a circular, eight foot diameter ring constructed of 1⅜ inch pipe. However, it will be apparent that any barrier suitably sized to prevent object 22 and member 24 from wrapping about the target suspension structure would be acceptable.

Another consideration in design of the present invention is the relationship between the length of the member 24 and the length of the swing suspension chains or ropes or other elongate members. By increasing both of these dimensions, a smooth long distance travel, tangential type play with significant movement of the ball and participant is achieved. Conversely, if these dimensions are shortened a more lively, angular action is likely to be achieved.

Another consideration is that it is desirable in certain embodiments to so relate the dimensions of the ball and swing that it is possible to reach the ball or target object from the swings when the target object is in its at rest position. If the apparatus is not so constructed, it is necessary to first start the target object moving, then mount the swing and coordinate swing movement to keep the object moving during play activity.

FIGS. 3 and 4 illustrate particularly one means of fastening support legs and members 32 to support ring 12. In those Figures, two-piece couplers 40 having coupler halves 42, 42 are shown. Each of the couplers is formed to define a hemispherical cross section T-shaped cavity which receives a portion of the support ring and an associated leg 14 or member 32. Half 42 further includes a plurality of ears 44 which mate with corresponding ears on its joining half. The halves of coupler 40 are secured by means of nuts and bolts or other suitable fasteners extending through the ears and fastening them securely together to enable the fastened halves to tightly grip the associated tubular members. Those of skill in the art will realize that this is but one expedient for making such structural connections, which might otherwise be welded or suitably fastened in a number of conventional ways.

FIGS. 5 and 6 are views of details of a suitable construction for fastening elongated tension members 46, which may be chain, rope or another suitable flexible members, to the support means. While a number of different fastening constructions could be used, the construction shown has been successfully used in one embodiment constructed. In FIGS. 5 and 6 elongated tension member 46, shown as a chain, is fastened by means of a S-hook 50 to a clevis 52. Clevis 52 is drilled to receive a bolt or a pin 54 by means of which it is attached to a yoke generally designated 56 through a clearance hole in an ear 58 projecting downwardly from the lower half of yoke 56. Yoke 56 includes upper and lower halves 58 and 60 respectively, each of which includes a pair of oppositely extending outwardly directed ears through which nuts and bolts 62 may pass to securely fasten halves of the yoke together about a portion of support ring 12 or any support frame. As shown in the drawing, upper half 60 includes a toothed or knurled portion adapted to securely engage the surface of the support ring to provide additional stability to the connection when nuts and bolts 62 are tightened. In preferred embodiments of the structure shown, the curvature of the concave halves of the yoke 56 which contact the outer surface of ring 12 will be slightly less than that of ring 12 to limit the area of contact and provide a firm connection.

FIGS. 7 and 8 show details of one preferred construction of the elongate flexible suspending member 24 and the structure of the target object and the target suspension to which member 24 is connected. In one preferred embodiment, the target object was molded of 3/32 inch wall vinyl in a generally spherical form having a twelve inch uninflated radius with an ear 70 integrally molded into the ball so that a portion of the internal cavity of the ball extended into the ear and surrounded a central clearance hole 72 therein. The ball had a valve 74 of conventional construction used for inflating play objects and was inflated to an eighteen to twenty inch radius for use. In target objects of this type it is preferable to place the valve 74 proximate the suspension connection so that it is unobtrusive and is protected from participant contact. As shown particularly in FIG. 7, flexible elongate suspending member 24 may comprise an interior nylon rope 76 with a lower end thereof looped and crimped by means of a metal crimp 78 to fasten it about ear 70. At its upper end nylon rope 76 is likewise looped and crimped by means of a crimp 80 which bears against a washer 82. Captivated between washer 82 and the upper surface of ear 70 is a flexible vinyl extrusion 84 which protects the rope and adds a slight amount of rigidity to member 24 to create the kind of pendulum action which is preferred in the embodiment of the invention shown.

Elongate flexible member 24 is preferably assembled first by looping and crimping its lower end by means of crimp 78 then sliding extruded sleeve 84 downward into contact with ear 70. This is followed by placement of washer 82 in contact with the upper end of sleeve 84, the exertion of a slight amount of tension on nylon rope 76 and a corresponding slight amount of compression of sleeve 84 and formation of the upper loop by means of crimp 80, which also functions to maintain the slight tension on the member by bearing against washer 82.

The loop at the upper end of member 24 is fastened by means of a S-hook 26 which extends through an eye bolt 88 in turn fastened to five-way socket 30. Five-way socket 30, in the particular embodiment shown, includes a central cylindrical portion having a cylindrical wall 90 with upper and lower walls 92 and 94 defining a closed solid. Radiating outwardly and welded or otherwise fastened to the outer surface of wall 90 are a plurality of cylindrical sleeves 96. Each sleeve is provided with set screws 98 for fastening of members 32 received therein, which members support socket 30 above support ring 12 in assembly. As shown particularly in FIG. 7 eye bolt 88 is fastened by means of a captivated nut to a lower wall 94.

As previously mentioned, a large number of alternatives for mounting of the target object and in choice of the target object, all within the scope of the present invention, are possible. For example, the suspending structure might well be a separate cantilevered beam extending from a pole external to the swing support structure. Also as previously mentioned, the ball might be supported on a flexible pedestal above the ground surface. As will be apparent to those of skill in the art alternative suspension means other than the specific elongate flexible member described herein might well be used for suspending the target object. Likewise, even in the class of embodiments of the invention shown in the FIGURES, a large number of different target objects such as foam-filled or liquid-filled balls or other polyhedrons might be effectively used as target objects.

Referring now to FIGS. 9 and 10 there is shown a suitable construction for fastening seat 20 of swing means 18 to elongate member 46. One loop of a S-hook 100 is fastened to a link of member 46, the opposite loop being fastened through a hole in seat 20 to suspend one side thereof. As shown in the drawings, seat 20 is preferably a flexible rubber-like or vinyl material, which may be internally reinforced with steel, wire or some other strengthening agent. As shown particularly in FIGS. 9 and 10, the flexible seat 20 may have a reinforcing bracket 102 which acts like a grommet to reinforce the hole receiving the lower loop S-hook 100. The grommet lessens stress concentration about the hole and distributes stress to lessen the chance of fatigue failure of the swing seat. As will be apparent to those of skill in the art, a number of other seat constructions would be acceptable. For example, a wooden rigid seat with ropes attached thereto through holes drilled at edges of the seat would be an acceptable alternative. It should be noted that it may be desirable, in embodiments having plural tension members fastening a seat shown in FIGS. 1 and 2, to space the connections to the support frame or support ring member somewhat farther than is usually used in conventional swing construction. This will tend to provide more stability and cause the swing to be more likely to reassume its normal path of travel following the imparting of a sideward movement due to contact between the participant and the target object.

Figure 12:
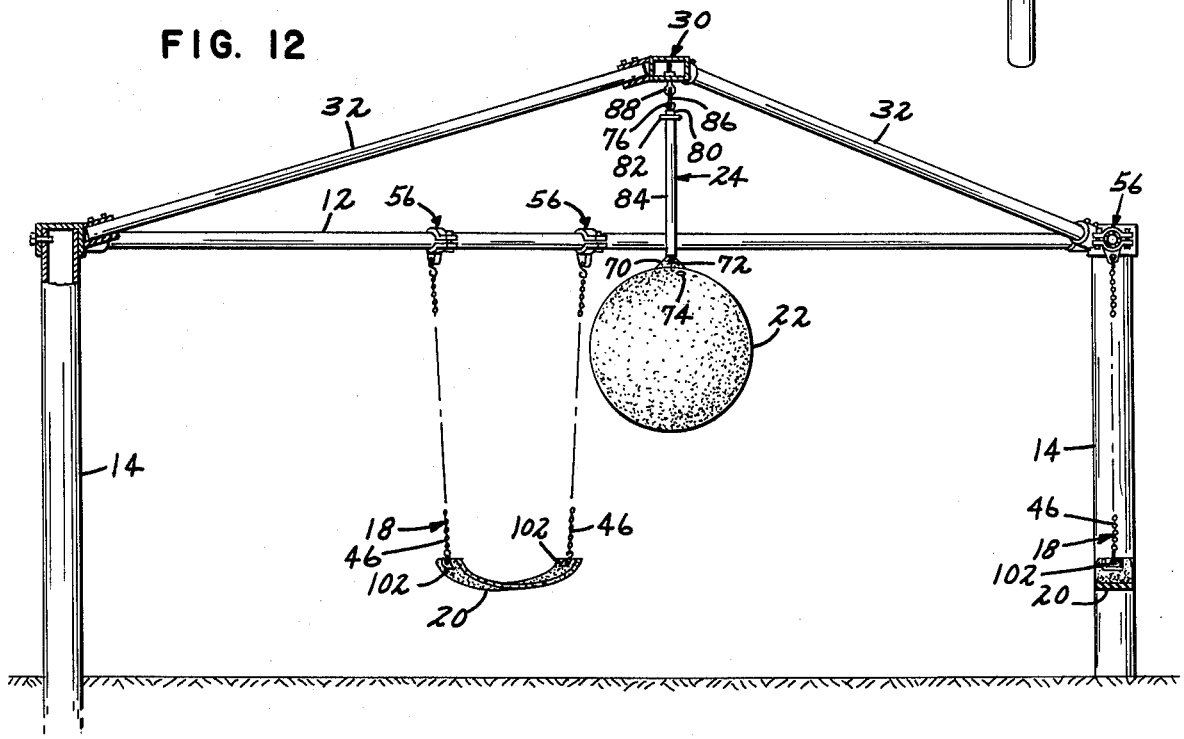
FIG. 12 is a sectional view through the structure of FIG. 11 taken generally along line 12—12 thereof.

FIGS. 11 and 12 show an alternate embodiment within one class of embodiments of the present invention in which three rather than five swings are used and a support ring is in the shape of an equilateral triangle. In these Figures, elements corresponding to certain elements shown in FIGS. 1 and 2 are identified with like numerals. As will be apparent to those of skill in the art, the invention is not limited to a particular support structure configuration. On the contrary, the support ring may be constructed and supported in any suitable manner typical to conventional playground equipment construction.

From the foregoing it is apparent that there has been provided, a playground apparatus invention which provides improved exercise and adds interest to the swinging activity engaged in for pleasure by swing occupants. In addition, by combining the swinging activity with the use of the target having a specific target objective which the participant desires to attain, the apparatus tends to develop timing and coordination in conjunction with stimulating exercise. While the invention has been described in conjunction with specific embodiments thereof, it will be evident that many alternatives, modifications, and variations will be apparent to those of skill in the art in the light of the foregoing description. Accordingly, it is intended to embrace all such alternatives, modifications and variations as fall within the spirit and broad scope of the appended claims.

What is claimed is:

1. Recreational apparatus comprising:
   (a) a closed ring tubular member;
   (b) support means including a plurality of spaced apart legs for supporting said closed ring tubular member generally horizontally above a ground surface;
   (c) a plurality of seats spaced apart from one another and suspended from said tubular member by means of first elongated tension members;
   (d) target support means extending across said closed ring tubular member;
   (e) a spherical target object; and
   (f) a second elongated tension member connected between said object and said target support means and pendulously suspending said object from said target support means; and
   (g) the dimensions of said tension members, target object, and target support means being so related that players swinging to and fro on said seats may contact said target object with their feet.

2. The apparatus of claim 1 wherein said target object is an air-filled inflatable ball, and said elongated tension member comprises a rope with loops formed therein at opposite ends thereof for attachment to said ball and said target support means.

3. The apparatus of claim 1 wherein said target object is an inflatable ball molded of resilient material with a central cavity surrounded by a resilient wall and includes an integral molded ear with an aperture therein to which said tension member may be fastened.

4. The apparatus of claim 3 wherein said target object is provided with an inflation valve positioned proximate said ear.

5. Playground apparatus, comprising in combination:
   (a) a generally horizontally oriented swing support ring;
   (b) a plurality of legs attached about said support ring for supporting said ring above a ground surface;
   (c) an odd numbered plurality of swings suspendedly connected to said support ring for generally pendulous oscillation above said ground surface; said swings being equally spaced about said ring;

(d) a target support member spanning said support ring with opposite ends thereof attached to said ring;

(e) an air-filled spherical ball; and (f) means suspending said ball from said support member centrally of said ring for pendulous movement with respect to a rest position;

(g) said structure being so dimensioned to allow players swinging to and fro on said swings to contact said ball when said ball is in said rest position.

6. The apparatus of claim 5 wherein said support ring defines a closed substantially circular configuration with said swings suspendedly connected thereto so that the normal paths of travel thereof define planes through the center of said ring.

7. The apparatus of claim 5 wherein said means suspending said ball comprises a plurality of elongated members of substantially equal length, one end of each said members connected together at a point centrally within said support ring and each member extending radially outward from said centrally located point with an opposite end of each of said members connected to said support ring.

8. The apparatus of claim 5 wherein said means suspending said ball comprises a flexible elongated tension member including an inner rope-like member covered by an outer resilient sleeve, said inner member defining loops at opposite ends thereof, and a target support frame, and said flexible elongated tension member is fastened to said ball and said frame by means of said loops.

9. Playground apparatus, comprising in combination:
a support structure;
at least three swing means suspended above a ground surface from said support structure for reciprocatory transport of a player riding thereon along fixedly defined paths which approach a common point;
a target object located at said common point; and
a means for suspending said target object from said support structure in the vicinity of said swing means, said support structure, swing means and suspending means being dimensioned so that said players contact said target object during the reciprocatory transport of said players on said swing means and said paths of movement of said plural swing means will be free of contact with each other and said support structure even after contact has been made by the players with said target object.

10. The apparatus of claim 9 wherein said target object comprises a solid object, and said securing means further comprises means resiliently supporting said solid object above the ground surface, said solid object being positioned so that a swing occupant may physically contact said solid object during swing travel.

11. The apparatus of claim 10 wherein said means resiliently supporting said object comprises a flexible elongate tension member having one end thereof fastened to said object, and an object support frame extending above said ground surface to which the opposite end of said member is attached for suspension of said object.

12. Plural swing playground apparatus, comprising in combination:

(a) plural swing support means each including a pair of tension members;

(b) at least three swing seats each suspended from said pair of elongated tension members so that said swing seats will move along fixedly defined paths, at least two of said swing seats being so oriented as to be capable of approaching a common point during cyclic movement thereof;

(c) a target object having a target objective located at said common point; and (d) target support means for supporting said target object, said swing support means, swing seats, and target support means being dimensioned so that the occupants of said swing seats compete by contacting said target object with their feet while engaged in cyclic movement on said swing seats and said paths of movement of said swing seats will be free of contact with each other and said swing support means even after contact has been made by the occupant with said target object.

13. The apparatus of claim 12 wherein said target object comprises a resilient spherical ball, and said support means further includes a flexible elongate tension member having one end thereof connected to said ball, and target object support frame to which the opposite end of said member is connected, whereby said ball is pendulously suspended above said ground surface from said common point.

14. The apparatus of claim 13 wherein said common point is a central point on said support means, and said target object support means provides suspension of said ball at said central point.

15. Recreational apparatus comprising:

(a) a frame member;

(b) support means including a plurality of spaced apart legs for supporting said frame member generally horizontally above a ground surface;

(c) at least three player support seats spaced apart from one another and each being suspended from said frame member by means of a pair of first elongated tension members so that said player support seats will move along fixedly defined paths, said player support seats being so oriented as to be capable of approaching a common point during cyclic movement thereof;

(d) target support means extending across said frame member;

(e) a target object located at said common point; and (f) a second elongated tension member connected between said object and said target support means and pendulously suspending said object from said support means;

(g) the dimensions of said tension members, said target object, and support means being so related that players swinging to and fro on said player support seats contact said target object with their feet and said paths of movement of said player support seats will be free of contact with each other and said support means even after contact has been made by the players with said target object.

16. The apparatus of claim 15 wherein said support frame member defines a closed odd-sided regular polygonal configuration and said swings are suspended one each from each of the sides thereof, each swing being mounted centrally of its respective side.

* * * * *